United States Patent
Patel et al.

(10) Patent No.: US 11,693,200 B2
(45) Date of Patent: Jul. 4, 2023

(54) DOUBLE BONDING WHEN FABRICATING AN OPTICAL DEVICE

(71) Applicant: Cisco Technology, Inc., San Jose, CA (US)

(72) Inventors: Vipulkumar K. Patel, Breinigsville, PA (US); Ravi S. Tummidi, Breinigsville, PA (US); Mark A. Webster, Bethlehem, PA (US)

(73) Assignee: Cisco Technology, Inc., San Jose, CA (US)

( * ) Notice: Subject to any disclaimer, the term of this patent is extended or adjusted under 35 U.S.C. 154(b) by 3 days.

(21) Appl. No.: 17/305,986

(22) Filed: Jul. 19, 2021

(65) Prior Publication Data
US 2023/0015671 A1    Jan. 19, 2023

(51) Int. Cl.
*G02B 6/43* (2006.01)
*G02B 6/42* (2006.01)

(52) U.S. Cl.
CPC ............... *G02B 6/43* (2013.01); *G02B 6/425* (2013.01); *G02B 6/4236* (2013.01); *G02B 6/4274* (2013.01); *G02B 6/4204* (2013.01)

(58) Field of Classification Search
CPC ........ G02B 6/43; G02B 6/425; G02B 6/4274; G02B 6/4204
See application file for complete search history.

(56) References Cited

U.S. PATENT DOCUMENTS

| | | | |
|---|---|---|---|
| 9,164,235 B1 | 10/2015 | Tummidi et al. | |
| 9,274,275 B2 | 3/2016 | Webster et al. | |
| 9,618,699 B2 | 4/2017 | Tummidi et al. | |
| 9,651,739 B2 | 5/2017 | Webster et al. | |
| 9,864,133 B2 | 1/2018 | Patel et al. | |
| 9,933,566 B2 | 4/2018 | Patel et al. | |
| 10,054,745 B2 | 8/2018 | Webster et al. | |
| 10,145,758 B2 | 12/2018 | Traverso et al. | |
| 10,914,892 B2 | 2/2021 | Bayn et al. | |
| 11,002,980 B1 | 5/2021 | Ling et al. | |
| 2016/0109655 A1 | 4/2016 | Vurgaftman et al. | |
| 2016/0327759 A1 | 11/2016 | Keyvaninia et al. | |
| 2018/0372968 A1 | 12/2018 | McKay et al. | |
| 2020/0152615 A1 | 5/2020 | Krasulick et al. | |
| 2020/0166720 A1* | 5/2020 | Charles | G02B 6/428 |
| 2021/0116637 A1 | 4/2021 | Li et al. | |

OTHER PUBLICATIONS

U.S. Appl. No. 16/862,262 "Process Margin Relaxation," filed Apr. 29, 2020.
A. Rahim et al., "Expanding the Silicon Photonics Portfolio With Silicon Nitride Photonic Integrated Circuits," in Journal of Lightwave Technology, vol. 35, No. 4, pp. 639-649, 15 Feb. 15, 2017, doi: 10.1109/JLT.2016.2617624. [Abstract Only].

* cited by examiner

*Primary Examiner* — John Bedtelyon
(74) *Attorney, Agent, or Firm* — Patterson + Sheridan, LLP

(57) ABSTRACT

Embodiments herein describe using a double wafer bonding process to form a photonic device. In one embodiment, during the bonding process, an optical element (e.g., a high precision optical element) is optically coupled to an optical device in an active surface layer. In one example, the optical element comprises a nitride layer which can be patterned to form a nitride waveguide, passive optical multiplexer or demultiplexer, or an optical coupler.

19 Claims, 11 Drawing Sheets

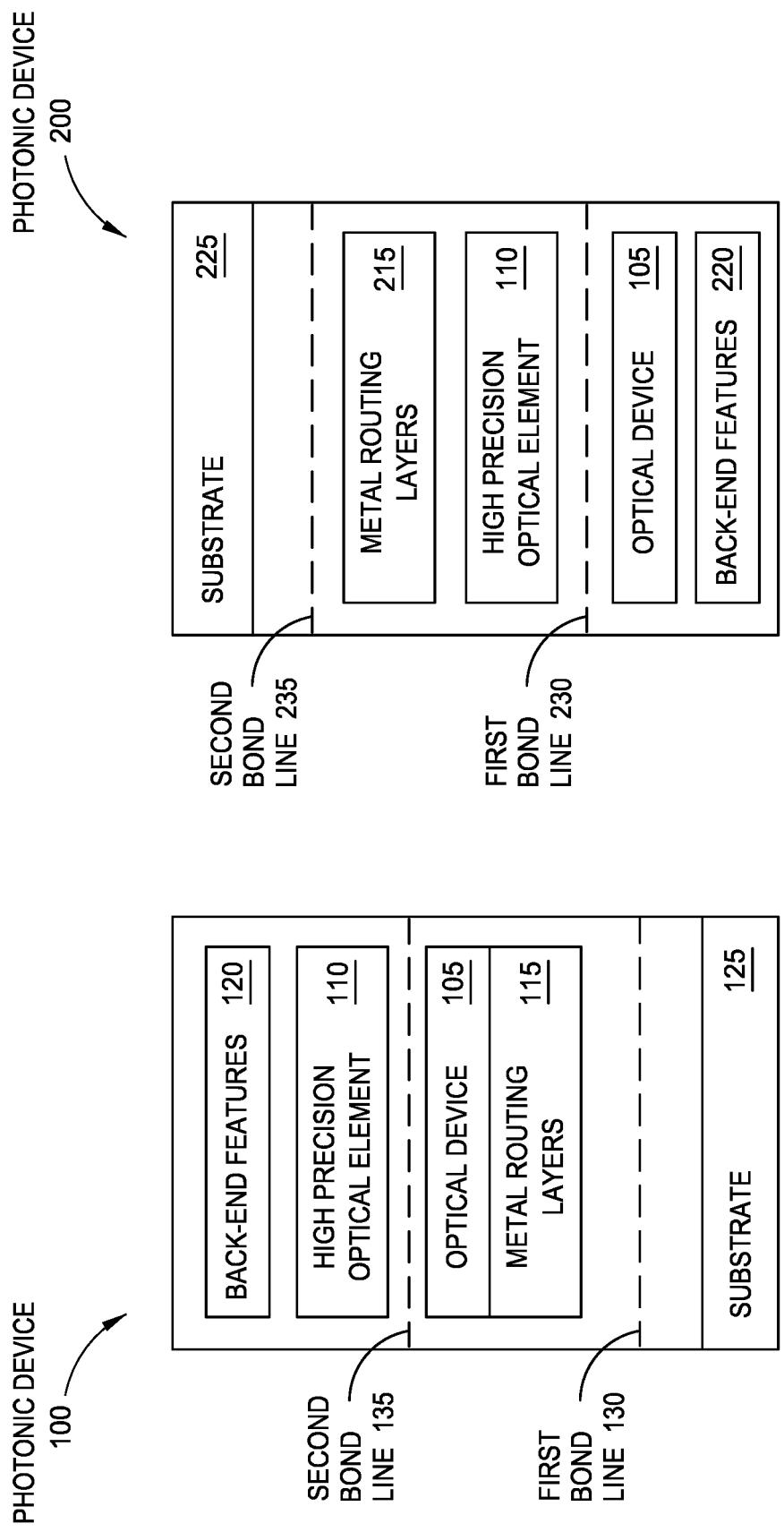

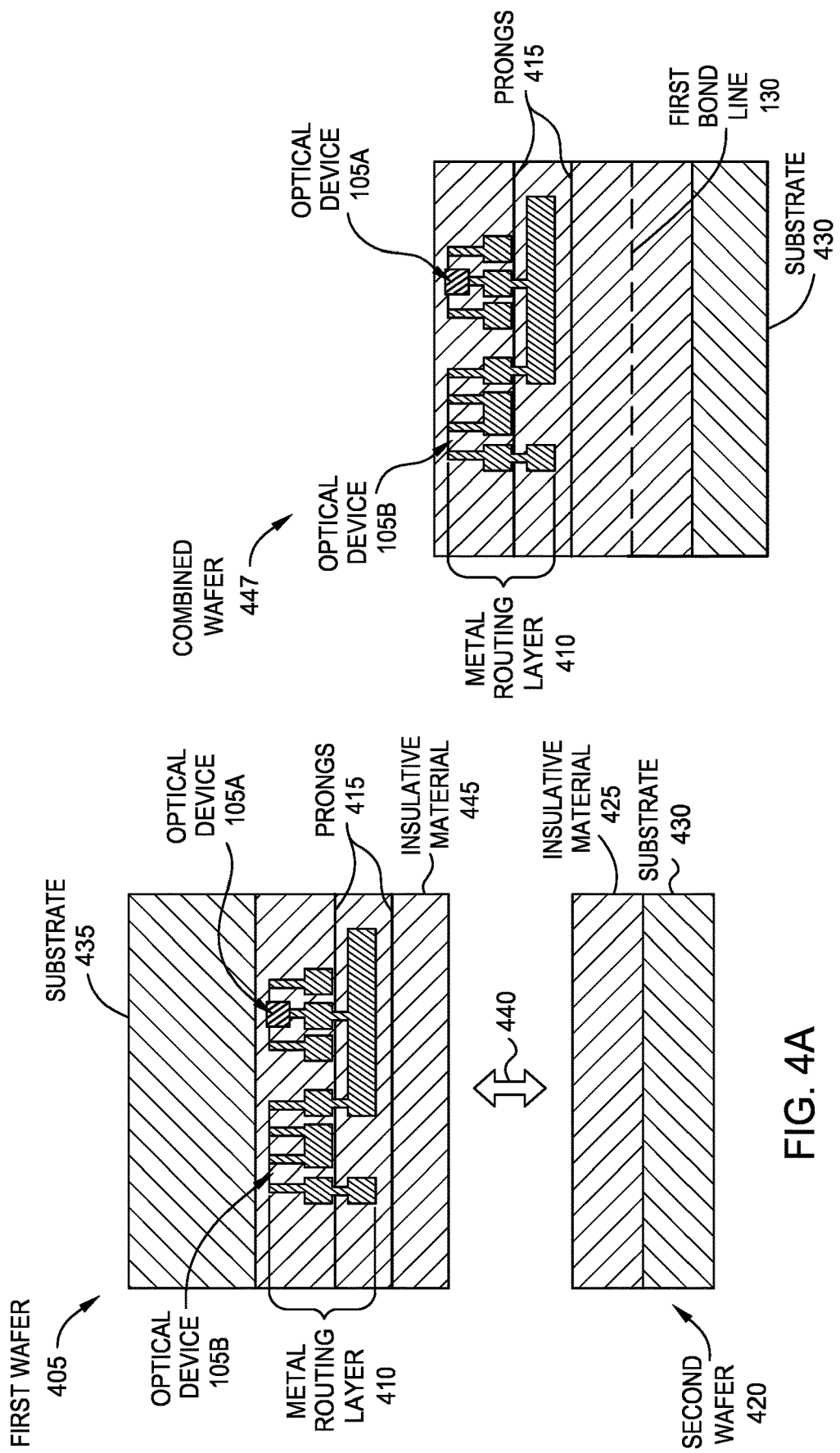

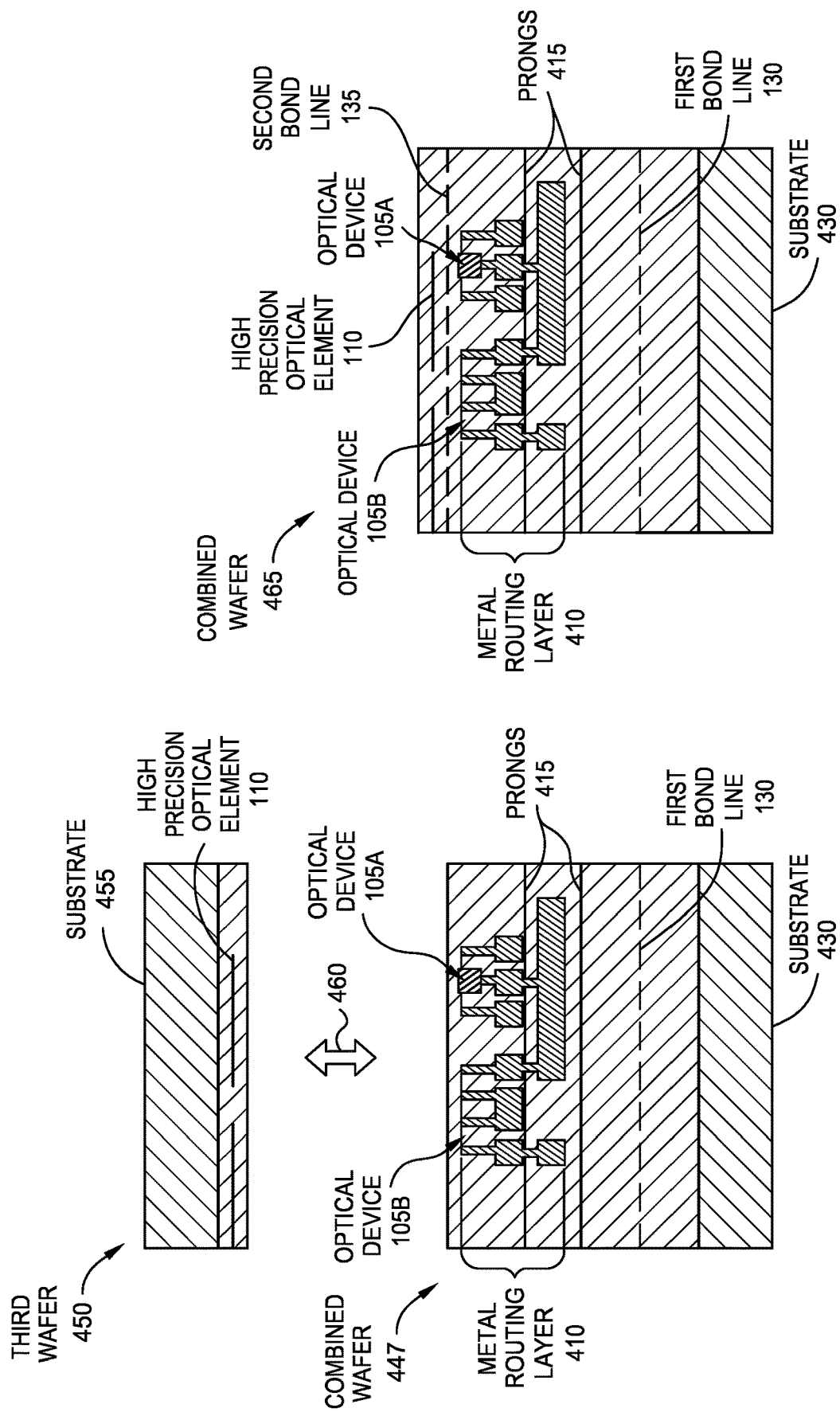

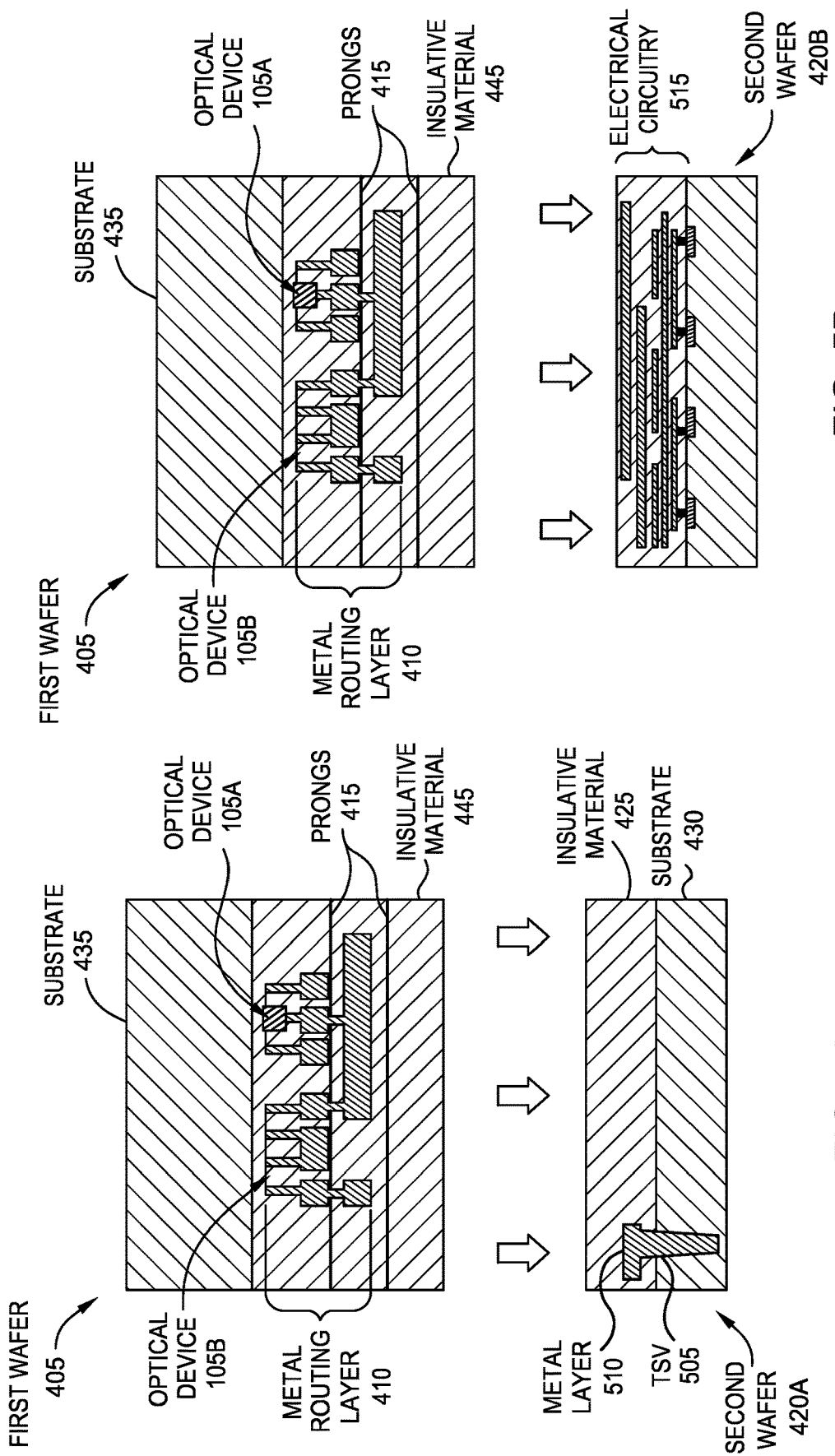

DOUBLE BONDING WHEN FABRICATING AN OPTICAL DEVICE

TECHNICAL FIELD

Embodiments presented in this disclosure generally relate to performing double wafer bonding when fabricating photonic devices.

BACKGROUND

SOI optical systems may include an active surface layer that includes optical devices such as waveguides, optical modulators, optical detectors, and the like. Transmitting optical signals from and to this active surface layer introduces many challenges. In some optical systems, lenses are used to focus the light from an external fiber optic cable or a laser source into the active surface layer, thereby shrinking the mode or adjusting the numerical aperture such that the optical signal can be efficiently transferred into the sub-micron waveguides. Further, in addition to transferring optical signals between the optical system and an external light source, the optical device in the active surface layer may couple to other optical elements in a different layer in the optical system (e.g., a photonic chip).

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

FIGS. 1 and 2 illustrate photonic devices formed using double wafer bonding processes, according to embodiments herein.

FIGS. 4A-4E illustrate fabricating a photonic device according to the flowchart in FIG. 3, according to embodiments herein.

FIGS. 5A and 5B illustrate optional features in wafers being bonded, according to embodiments herein.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 3:
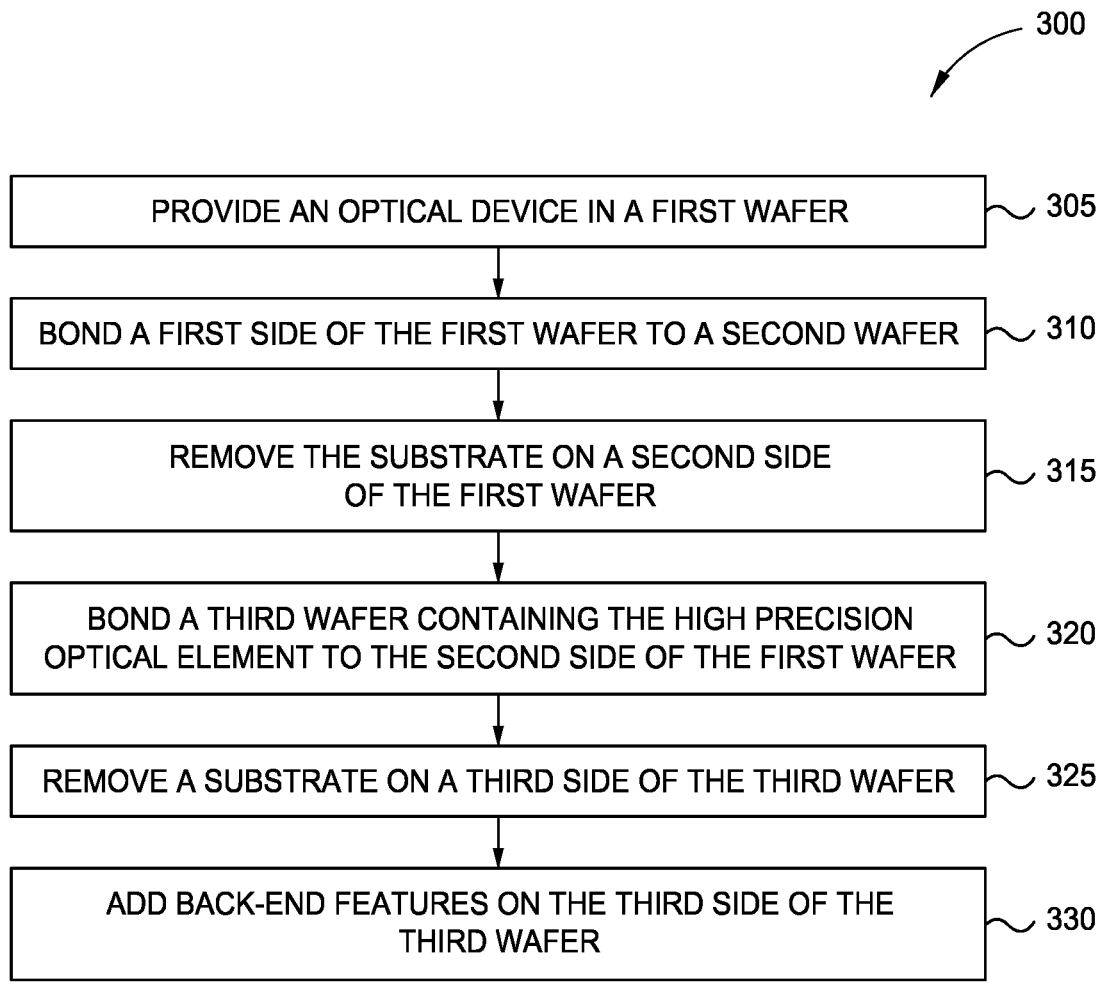
FIG. 3 is a flowchart for forming a photonic device using a double wafer bonding process, according to one embodiment.

One embodiment presented in this disclosure is a method that includes providing an optical device in a first semiconductor wafer, providing an optical element in a second semiconductor wafer, wafer bonding the first and second wafers to form a combined wafer, wherein bonding the first and second wafer optically couples the optical device to the optical element, removing a substrate corresponding to the second wafer from the combined wafer, and performing a second wafer bonding process either (i) before forming the combined wafer or (ii) after removing the substrate corresponding to the second wafer.

Another embodiment herein is a photonic device that includes a first semiconductor wafer comprising a first optical device, a second semiconductor wafer comprising an optical element where the first and second wafers are bonded at a first bond line and the optical device is optically coupled to the optical element, and a third semiconductor wafer comprising a substrate on a first side and an insulative material on a second side where the second side of the third wafer is wafer bonded to the second wafer to form a second bond line.

Another embodiment herein is a photonic device that includes a first semiconductor wafer comprising a first optical device, a second semiconductor wafer comprising an optical element where the first and second wafers are bonded at a first bond line and the optical device is optically coupled to the optical element, and a third semiconductor wafer comprising a substrate on a first side and an insulative material on a second side where the second side of the third wafer is wafer bonded to the first wafer to form a second bond line.

Example Embodiments

Embodiments herein describe using a double wafer bonding process to form a photonic device. In one embodiment, during the bonding process, a high precision optical element is optically coupled to an optical device in an active surface layer. In one example, the high precision optical element comprises a nitride layer which can be patterned to form one or more nitride waveguides, passive optical multiplexers or demultiplexers, or optical couplers. Integrating a nitride layer in a silicon photonics active surface layer is useful for optical device performance and design because nitride has a different (lower) refractive index than silicon and has optical properties with low thermal dependence. A nitride layer allows realization of truly passive multiplexer/demultiplexer designs and increases optical power capacity of a waveguide. However, forming the nitride layer during a front end of the line (FEOL) process introduces limitations on obtaining tight thickness distribution, low optical loss, and greater lithography resolution. That is, the nitride layer may be constrained by the conventional CMOS FEOL process integration because the nitride layer is formed after the silicon-on-insulator (SOI) patterning and hence the topology and reflection from layers below can impact the thickness control and lithography of the nitride layer. Further, since the SOI layer often has doped region, it limits the maximum deposition and anneal temperature that can be applied to improve the optical properties of the nitride layers.

The embodiments herein avoid these limitation by using a double bonding process to form a high precision optical element (e.g., a high precision nitride layer) in a separate wafer from the wafer containing the active surface layer. In that case, the formation of the high precision optical element is no longer constrained by the formation of the active surface layer (or another other element in that wafer), and thus, can result in improved thickness distribution, low optical loss, and greater lithography resolution relative to forming the optical element on the same wafer as the active surface layer. The two wafers can then be bonded together.

Moreover, a second wafer bonding can be used to provide a carrier semiconductor wafer for the photonic device. This carrier semiconductor wafer can include additional features such as a through silicon via or electrical circuitry such as CMOS electrical circuitry. Alternatively, a second wafer bonding is used to add backend features to the photonic device. These backend features can include back-side metal, through oxide vias, bond pads, and the like. In one embodiment, these backend features can connect electrically to an optical device in the active surface layer.

FIG. 1 illustrates a photonic device 100 formed using a double wafer bonding process, according to embodiments herein. The photonic device 100 includes two wafer bonding lines 130 and 135 indicating where different wafers were bonded together. Put differently, photonic device 100 is formed by bonding at least three wafers together at the bonding lines 130 and 135. In one embodiment, each of the wafers are semiconductor wafers that include at least a crystalline semiconductor substrate (e.g., silicon or III-V semiconductor) and one or more layers of insulative material (e.g., silicon dioxide or silicon nitride). The details of this bonding process are discussed in FIGS. 3 and 4A-4E.

The photonic device 100 includes an optical device 105 that may be disposed in an active surface layer. In one embodiment, the active surface layer is formed from crystalline silicon part of a SOI structure. The optical device 105 can include a waveguide, optical modulator, optical detector, and the like. The optical device 105 may include silicon such as a silicon waveguide or a silicon Mach-Zehnder Interferometer (MZI) and may be include a different material such as a germanium detector integrated into a silicon active surface layer.

The optical device 105 is electrically connected to metal routing layers 115 that provide electrical connections between the optical device 105 and other components in the photonic device 100. For example, the metal routing layers 115 can be used to route control signals to the optical device, or receive electrical measurements from the optical device 105.

The photonic device 100 also includes a high precision optical element 110 (e.g., a high precision nitride layer) that is disposed above the second bond line 135. In one embodiment, the high precision optical element 110 is formed in a different wafer than the optical device 105. As a result, the fabrication processes used to form the optical device 105 do not constrain or limit the fabrication processes used to form the high precision optical element 110. Although it may be possible to form the optical element 110 on the same wafer as the optical device 105, the fabrication steps would be constrained which means the optical element 110 would not be "high precision" such as having a wider thickness distribution, greater optical loss, and poorer lithography resolution than when the optical element 110 is formed in a separate wafer as shown in FIG. 1.

In one embodiment, when bonding two wafers at the second bond line 135, the high precision optical element 110 is optically coupled to the optical device 105. For example, the high precision optical element 110 may be a waveguide, optical coupler, or multiplexer/demultiplexer that is optically coupled to the optical device 105 such that optical signals can be transferred there between. In one embodiment, the high precision optical element 110 and the optical device 105 transfer an optical signal adiabatically.

Moreover, the photonic device 100 includes backend features 120 which, in one embodiment, are formed after the high precision optical element 110 and the optical device 105 have been wafer bonded together. The backend features 120 can include such features as backend metal routing layers, bond pads, through oxide vias (TOV), and the like. For example, the backend features 120 may include a bond pad that is electrical coupled, via a TOV to the metal routing layers 115 and to the optical device 105. However, the backend features 120 are not limited to these examples and can be any desired feature that can be formed using fabrication processes that do not damage the high precision optical element 110 and the optical device 105, which may already be formed in the photonic device 100.

Further, while the photonic device 100 does not include any optical or electrical features below the first bond line 130, in other embodiments there could be electrical circuitry disposed in the oxide or substrate 125 (e.g., a thick crystalline semiconductor layer such as silicon). For example, the wafer containing the substrate 125 may be processed to include electrical circuitry such as vias or CMOS circuitry before being bonding to the wafer containing the optical device 105 at the first bond line 130. Examples of this are shown in FIGS. 5A and 5B.

Although not specifically labeled, the material above the substrate 125 in the photonic device that is not specifically labeled can be an insulative material such as silicon dioxide.

FIG. 2 illustrates a photonic device 200 formed using a double wafer bonding process, according to embodiments herein. Like the photonic device 100, the photonic device 200 includes two wafer bonding lines 230 and 235 indicating where different wafers were bonded together. Put differently, photonic device 200 is formed by bonding at least three wafers together at the bonding lines 230 and 235. In one embodiment, each of the wafers are semiconductor wafers that include at least a crystalline semiconductor substrate (e.g., silicon or III-V semiconductor) and one or more layers of insulative material (e.g., silicon dioxide or silicon nitride). The details of this bonding process are discussed in FIGS. 6 and 7A-7F.

The photonic device 200 includes the optical device 105 that may be disposed in an active surface layer that is optically coupled to the high precision optical element 110. The optical device 105 and high precision optical element 110 can be any of the examples discussed above. Furthermore, for the advantages discussed above, the optical device 105 can be formed on a separate wafer as the optical element 110 before those wafers are bonded together at the first bond line 230.

In FIG. 2, the high precision optical element 110 is disposed between the optical device 105 and metal routing layers 215. Nonetheless, the metal routing layers 215 may be electrically connected to the optical device 105 using, e.g., TOVs. The metal routing layers 215 can be used to route control signals to the optical device, or receive electrical measurements from the optical device 105.

Moreover, the photonic device 200 includes backend features 220 which, in one embodiment, are formed after the high precision optical element 110 and the optical device 105 have been wafer bonded together. The backend features 220 can include any of the example features discussed in FIG. 1.

Although not specifically labeled, the material below the substrate 225 (e.g., a thick crystalline semiconductor layer such as silicon) in the photonic device 200 that is not specifically labeled can be an insulative material such as silicon dioxide.

FIG. 3 is a flowchart of a method 300 for forming a photonic device using a double wafer bonding process, according to one embodiment. In one embodiment, the method 300 can be used to fabricate the photonic device 100 in FIG. 1. For ease of explanation, the method 300 is also discussed in tandem with FIGS. 4A-4E.

At block 305, a first wafer (e.g., the first wafer 405 in FIG. 4A) is provided that includes at least one optical device. In one embodiment, the optical device that may be disposed in an active surface layer, and more specifically, an active surface layer formed in crystalline silicon. The optical device can include a waveguide, optical modulator, optical detector, and the like. In any case, the optical device can be formed using any suitable fabrication technique.

FIG. 4A illustrates a first wafer 405 that has been processed to include multiple optical devices 105. In this example, the optical device 105A is an optical detector (e.g., a germanium optical detector), while the optical device 105B is an optical modulator. To route electrical signals to or from the optical devices 105A and 105B, the first wafer 405 includes metal routing layers 410 which include patterned metal (or conductive) layers that are interconnected using vias. Further, the first wafer 405 includes prongs 415 which are waveguides that can serve as an optical adapter to exchange optical signals between the first wafer 405 and an external optical device (e.g., an optical fiber, fiber array unit (FAU), laser source, lens, etc.).

In one embodiment, the prongs 415 (e.g., silicon nitride or silicon oxynitride waveguides) are fabricated using middle end of line (MEOL) processes and interspersed with metal routing layers 410. As discussed above, nitride waveguides may be constrained by the conventional CMOS FEOL and MEOL process integration. One possible implementation of the embodiment herein is to form a high precision nitride waveguide on a separate wafer that can then be bonded to the first wafer 405. This nitride waveguide can be used along with the prongs 415 to form an edge coupler to transfer light between the photonic device formed in the wafers and an external optical device. However, this is just one example. In other examples, the first wafer may not include the prongs, and the high precision optical element may be used for different reasons than to form an edge coupler, such as a passive multiplexer or demultiplexer.

At block 310, a first side of the first wafer 405 is wafer bonded to a second wafer (e.g., the second wafer 420 in FIG. 4A). Bonding the first and second wafers 405, 420 as shown by the arrow 440 creates a wafer bond line (e.g., the first bond line 130 in FIG. 1). That is, the first wafer 405 is arranged with a substrate 435 (e.g., a crystalline semiconductor) facing up so that an insulative material 445 of the first wafer 405 is bonded to an insulative material 425 of the second wafer 420 (e.g., an oxide-oxide bond). In one embodiment, the insulative material 425, 445 is the same (e.g., silicon dioxide), but it may be possible to bond different types of insulative material together. In general, the embodiments herein can be used with any types of materials that can form a wafer bond between the first and second wafers 405, 420. FIG. 4B illustrates the result of bonding the wafers to form a combined wafer 447.

At block 315, the substrate 435 of the first wafer, which is on the opposite side forming the wafer bond line 130, is removed. In one embodiment, the second wafer 420 is a carrier wafer that provides structural support to the first wafer 405. That way, the substrate 435 of the first wafer 405 can be removed using, e.g., etching, wafer grinding, or a chemical-mechanical polishing (CMP) as shown in FIG. 4B. That is, the substrate 430 of the second wafer provides structural support for the remaining portions of the combined wafer 447 as the substrate 435 is removed.

In FIG. 4B, a thin portion of insulative material remains on top of the optical devices 105, which can include the active surface layer. The etching process that removes the substrate 435 may also remove some of the insulative material above the optical devices 105A and 105B until a thin layer remains.

At block 320, a third wafer (e.g., the third wafer 450 in FIG. 4C) containing the high precision optical element 110 is bonded to the second side of the first wafer to form a bond line (e.g., the second bond line 135 in FIG. 1). That is, the third wafer 450 is bonded to a side of the combined wafer 447 where the substrate 435 was removed above the optical devices 105. This bonding is illustrated by arrow 460 in FIG. 4C.

As mentioned above, the high precision optical element 110, which is a high precision waveguide in this example (e.g., a silicon nitride or silicon oxynitride waveguide), can be formed independently of the optical devices 105, metal layers 410, and prongs 415 formed in the first wafer 405 (which are now in the combined wafer 447). Thus, the high precision optical element 110 can be fabricated without being limited by the FEOL processes using when fabricating the first wafer. As a result, the high precision optical element 110 may benefit from improved thickness distribution, low optical loss, and greater lithography resolution relative to the same element 110 being formed in the first wafer 405.

Bonding the third wafer 450 to the combined wafer 447 (e.g., the side of the first wafer where its substrate was removed), optically couples the high precision optical element 110 to at least one of the optical devices 105. In this manner, the high precision optical element 110 can exchange optical signals with the optical device 105. Further, the third wafer 450 can include multiple high precision optical elements which are respectively optically coupled to one of the optical devices 105. For example, the third wafer 450 can be processed to include a nitride layer where multiple high precision optical waveguides are patterned and then aligned to optical devices 105 in the combined wafer 447 during wafer bonding.

In one example shown in FIG. 4C, the high precision optical element 110 is also optically coupled to the prongs 415 to form an optical adapter (e.g., an edge coupler). For instance, the prongs 415 may receive an optical signal with a mode size much greater than a micron from an external light source (e.g., 8-10 microns when receiving light from optical fiber). The prongs 415 and the high precision optical element 110 may reduce the mode size of the optical signal to less than a micron so that most of the optical signal propagates along the high precision optical element 110. The high precision optical element 110 can then transfer the optical signal to the optical device 105. The process can also work in reverse where the high precision optical element 110 receives an optical signal from the optical device 105 with a mode size less than a micron and then, along with the prongs 415, increases the mode size before transmitting the optical signal into the optical fiber. Examples of such optical adapters are discussed in U.S. Pat. No. 9,274,275 which is incorporated herein by reference.

At block 325, the substrate 455 on a third side of the third wafer 450 is removed. This is shown in FIG. 4D where a thin layer of insulative layer is left above the high precision optical element 110. This thin layer provides a surface for further processing the combined wafer 465 which contains portions of the first, second, and third wafers.

Figure 4E:
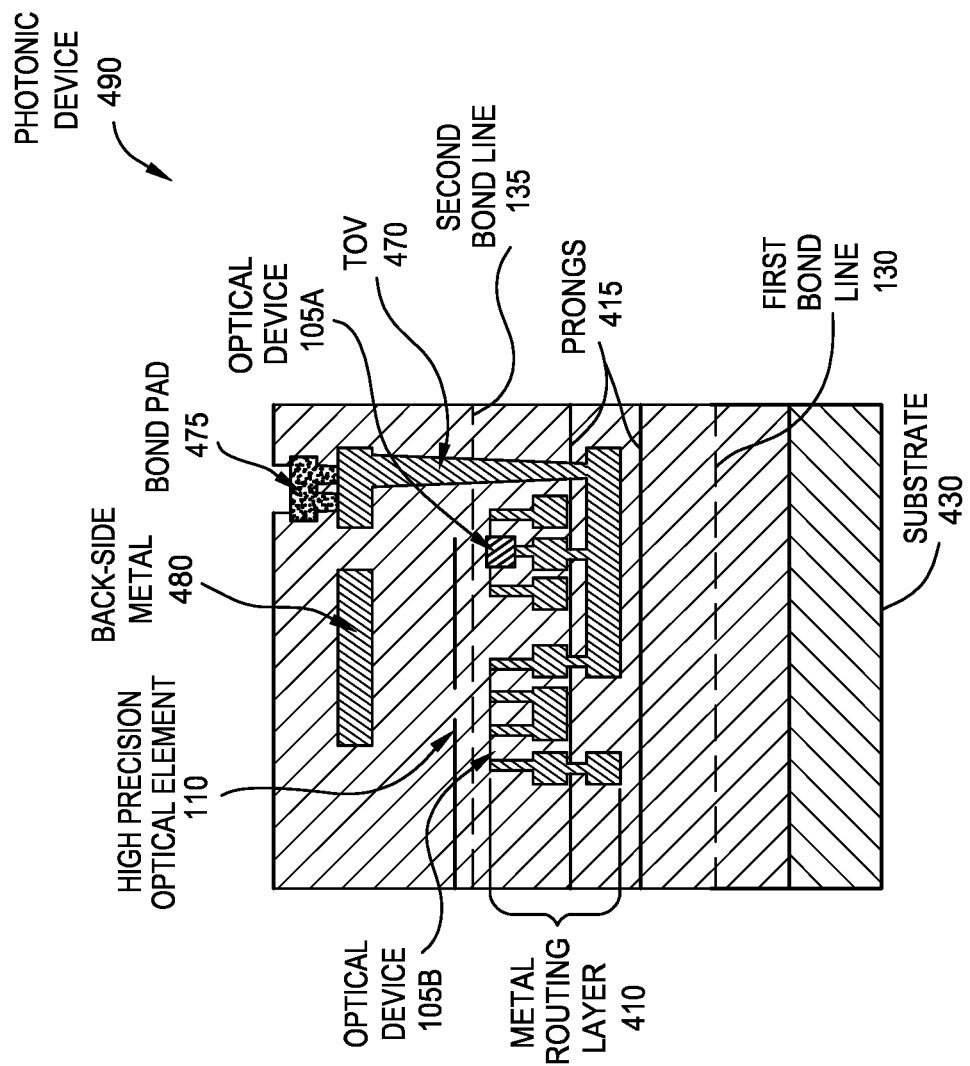

At block 330, backend features are added on the third side of the third wafer. As shown in FIG. 4E, these backend features can include a TOV 470 that extends from a layer above the high precision optical element 110 to the metal routing layers 410. At an upper end, the TOV 470 electrically connects to a bond pad 475 which can be solder bonded to an electrical IC (not shown). The electrical IC can provide control signals to one of the optical devices 105, or receive electrical measures from one of the optical devices 105. In addition, back-side metal 480 (e.g., part of a back-side metal layer) is added to the photonic device 490 which can provide additional electrical routing layers. In addition to including metal routing formed by the back-side metal 480, the back-side metal layer can include electrical vias (e.g., TOV 470) and bonding elements (e.g., bond pad 475).

FIGS. 5A and 5B illustrate optional features in wafers being bonded, according to embodiments herein. In one embodiment, FIGS. 5A and 5B illustrate that features can be added to the second wafer 420 shown in FIG. 4A, which are wafer bonded to the first wafer 405. That is, in FIG. 5A, the second wafer 420A is a silicon wafer with a through silicon via (TSV) 505 connected to a metal layer 510. After being bonded to the first wafer 405, the substrate 430 of the second wafer 420A can be processed to connect the bottom end of the TSV 505 to another electrical component (e.g., additional metal routing layers or a bond pad).

In FIG. 5B, the second wafer 420B includes electrical circuitry 515 that can include CMOS or Bipolar CMOS (BiCMOS) circuitry such as drivers, transimpedance amplifiers (TIAs), and the like. Because this circuitry 515 is formed in the second wafer 420B, it can be fabricated using process steps that are independent from the process steps used to fabricate the first wafer 405. Forming the electrical circuitry 515 on the second wafer 420B can provide greater density of CMOS/BiCMOS circuitry in the photonic device.

Figure 6:
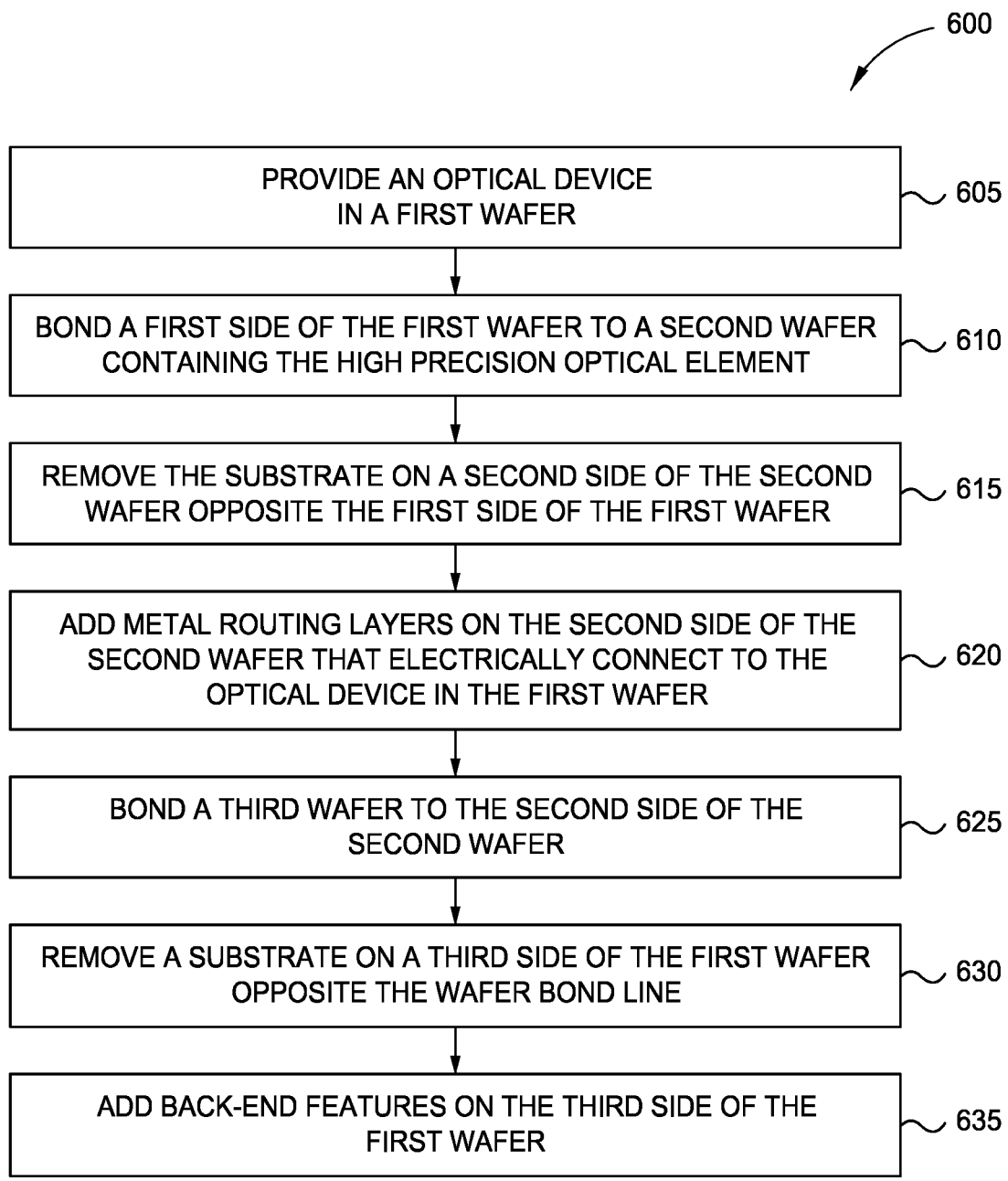
FIG. 6 is a flowchart for forming a photonic device using a double wafer bonding process, according to one embodiment.

FIG. 6 is a flowchart of a method 600 for forming a photonic device using a double wafer bonding process, according to one embodiment. In one embodiment, the method 600 can be used to fabricate the photonic device 200 in FIG. 2. For ease of explanation, the method 300 is discussed in tandem with FIGS. 7A-7F.

At block 605, a first wafer (e.g., the first wafer 705 in FIG. 7A) is provided that includes at least optical device. The optical device can be any of the examples discussed above. However, the first wafer 705 may not yet include any metal layers connecting to the optical device 105.

Figures 7A, 7B:
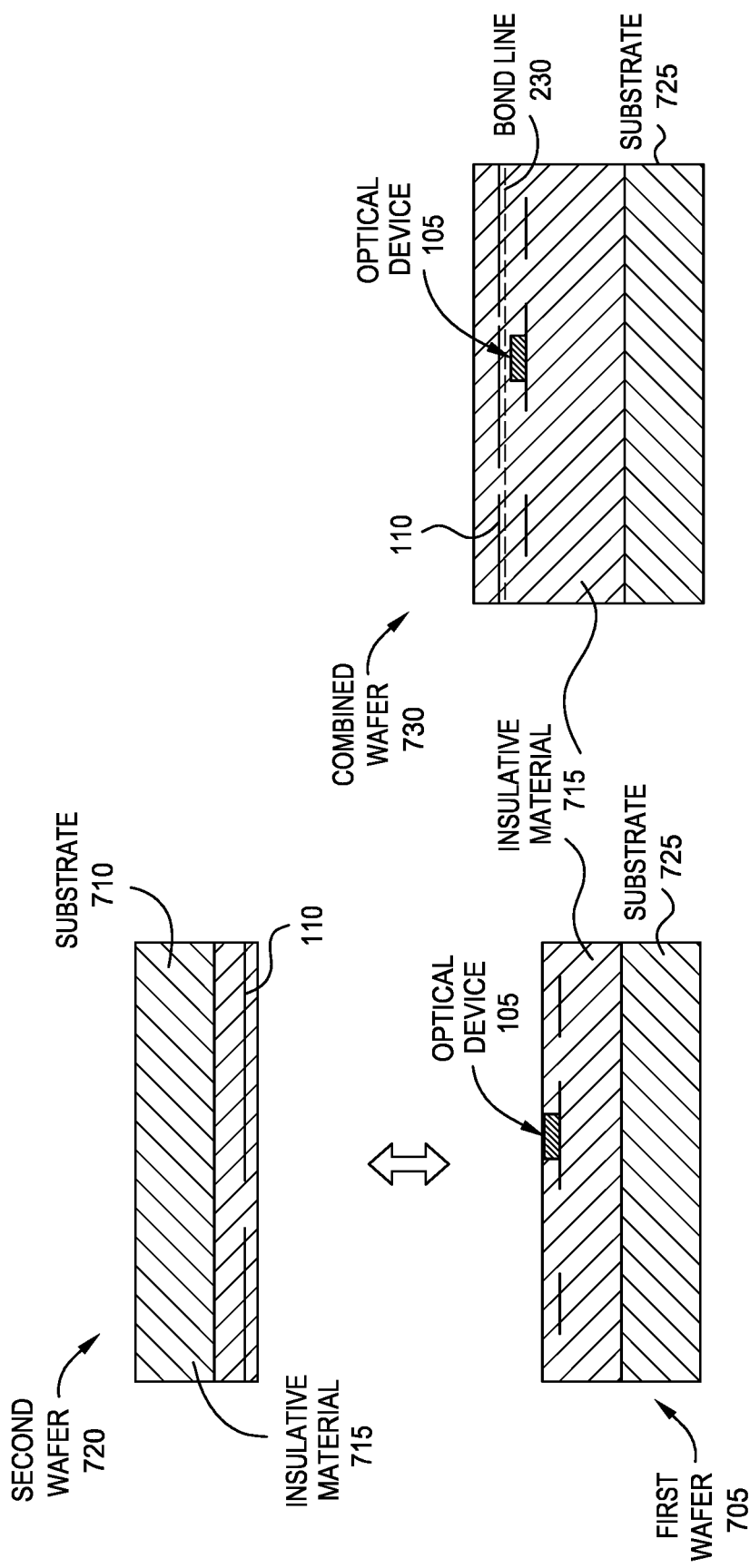
FIGS. 7A-7F illustrate fabricating a photonic device according to the flowchart in FIG. 6, according to embodiments herein.

At block 610, a first side of the first wafer is bonded to a second wafer containing the high precision optical component. This is shown in FIG. 7A where a lower side of the first wafer 705 is bonded to an upper side of the second wafer 720 to create a first bond line 230. The wafer bond can be formed using an oxide-oxide bond between the insulative material 715, or any other suitable wafer bonding technique. In any case, bonding the two wafers together optically couples the optical device 105 to at least one high precision optical element 110 in the second wafer 720. Of course, the second wafer 720 may include multiple high precision optical elements 110 which are respectively optically coupled to multiple optical devices 105 in the first wafer 705 as part of the wafer bonding.

Like above, the high precision optical element 110, which is a high precision waveguide in the example illustrated in FIG. 7A (e.g., a silicon nitride or silicon oxynitride waveguide), can be formed independently of all the other wafers that are combined to form the photonic device. As a result, the high precision optical element 110 may benefit from improved thickness distribution, low optical loss, and greater lithography resolution relative to the same element 110 being formed in the same wafer having, e.g., the optical device 105 or CMOS circuitry.

At block 615, a substrate 710 on a second side of the second wafer that is opposite of the first side is removed. The substrate 710 can be removed using any of the wafer bonding techniques discussed above. In this example, the first wafer 705 serves as a carrier wafer where its substrate 725 provides support to the other portions of the combined wafer 730.

At block 620, metal routing layers are added on the second side of the second wafer that electrically connect to the optical device 105 in the first wafer. That is, features are added to the combined wafer 730 in FIG. 7B to result in the combined wafer 735 illustrated in FIG. 7C. The combined wafer 735 includes the metal routing layers 215 that connect to one or more optical devices 105 in the active surface layer. Although it appears in FIG. 7C that vias corresponding to these layers 215 extend through the high precision optical element 110, they may be at different depths in the direction extending in/out of the figure so that the vias do not actually cut through the high precision optical element 110.

The combined wafer 735 also includes germanium (Ge) 740 deposited on the active surface layer to form an optical detector in the surface layer. Further, the combined wafer 735 can include prongs 745 which can be optically coupled to the high precision optical element 110. As discussed above, the prongs 745 and the optical element 110 can form an optical adapter for exchanging optical signals with an external optical device. However, this is just one example implementation of the high precision optical element 110. In other embodiments, the high precision optical element 110 may be optical coupled to the optical device 105 and not to the prongs 745. In some embodiments, the combined wafer 735 may not have the prongs 745 and instead rely on a different type of optical adapter, such as a grating coupler or a lens system, to share optical signals with an external optical device.

At block 625, a third wafer (e.g., the third wafer 750 in FIG. 7D) is bonded to a second side of the second wafer. That is, the side of the combined wafer 735 which was processed to include the metal routing layers 215, the germanium 740, and the prongs 745 is then wafer bonded to the third wafer 750 to create the second wafer bond line 235. The third wafer 750 can be a silicon wafer, or any other suitable semiconductor wafer.

At block 630, the substrate 725 on a third side of the first wafer 705 opposite the wafer bond line is removed. In this example, the third wafer 750 serves as a carrier wafer to support the remaining portions of the combined wafer 755 illustrated in FIG. 7E so that the substrate 725 can be removed.

Figure 7D:
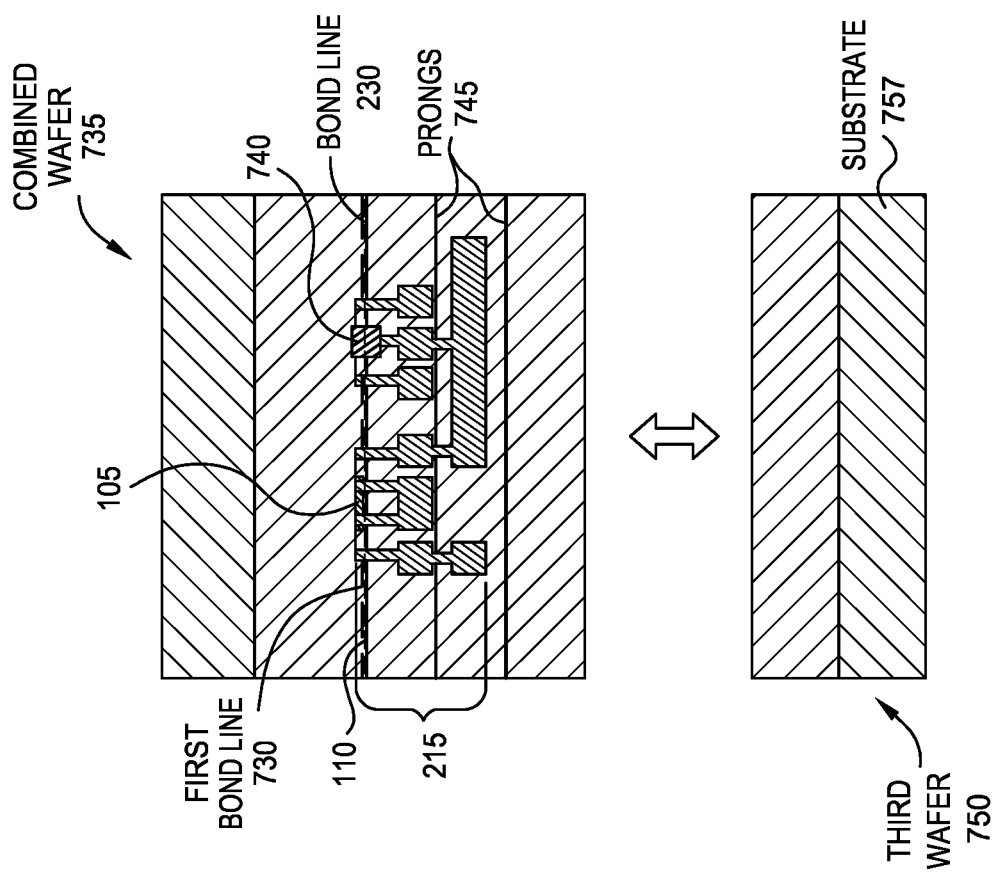
Figure 7C:
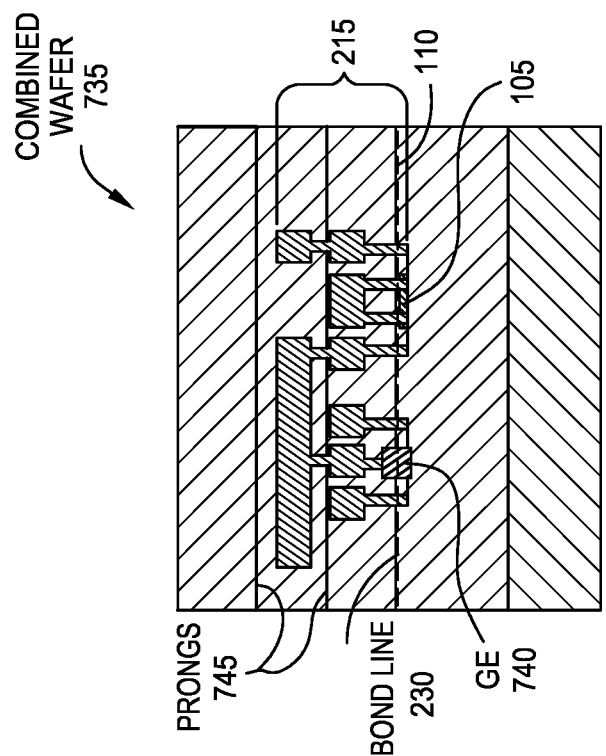
Figures 7E, 7F:
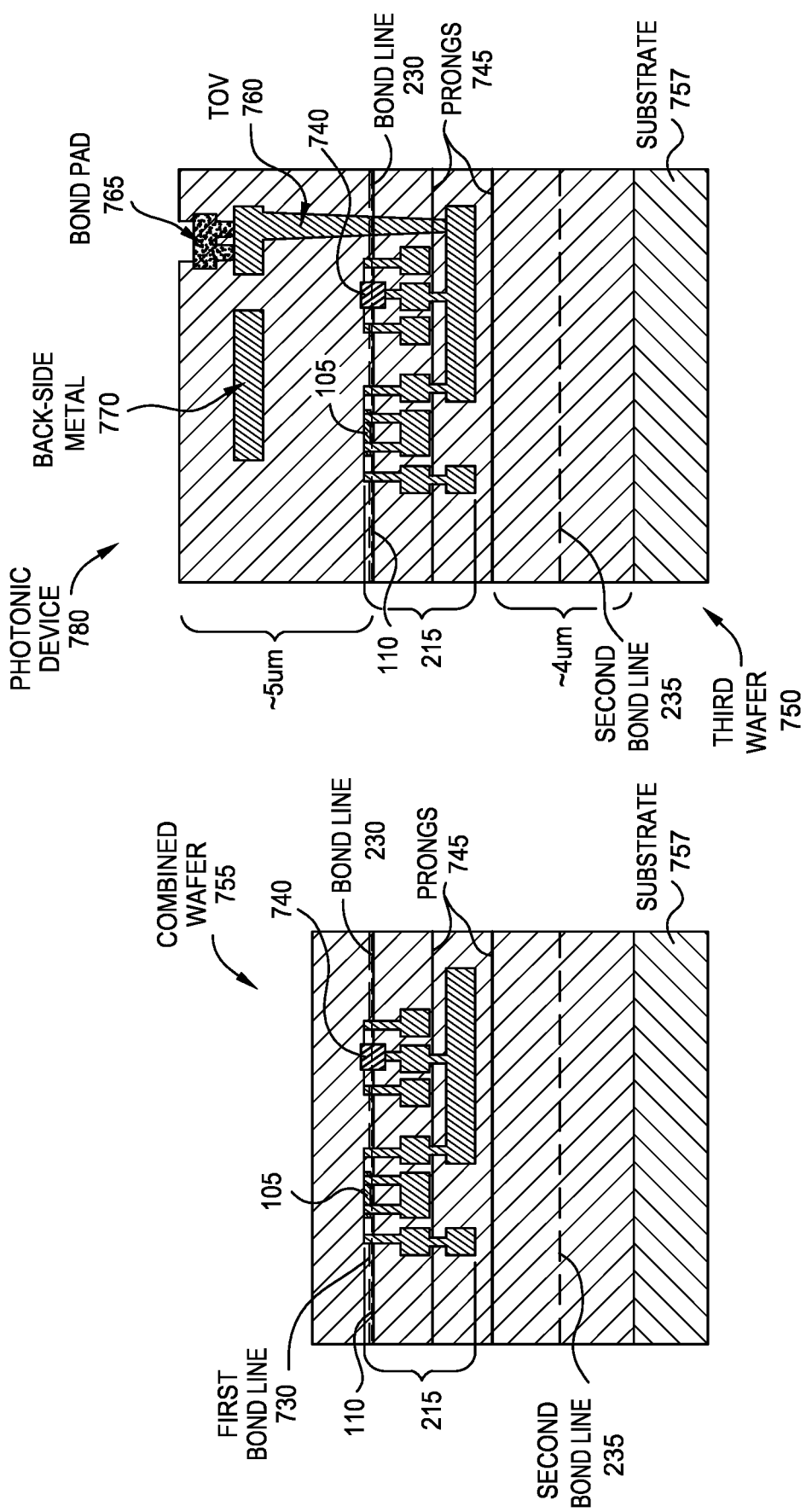

As shown in FIG. 7E, some of the insulative material is left above the optical devices 105 after the substrate 710 is removed. This insulative material serves as a processing surface where additional features can be added to the combined wafer 755.

At block 635, backend features are added on the third side of the first wafer. As shown in FIG. 7F, these backend features can include a TOV 760 that extends from a layer above the optical device(s) 105 to the metal routing layers 215. At an upper end, the TOV 760 electrically connects to a bond pad 765 which can be solder bonded to an electrical IC (not shown). The electrical IC can provide control signals to one of the optical devices 105, or receive electrical measures from one of the optical devices 105. In addition, back-side metal 770 is added to the photonic device 780 which can provide additional electrical routing layers. A back-side metal layer can include the back-side metal 770, the TOV 760, and the bond pad 765.

In FIG. 7F, the backend features can be added in a five micron thick region above the optical device(s) 105. Moreover, the distance between the substrate 757 and the bottommost prong 745 may be around four microns.

Figure 8:
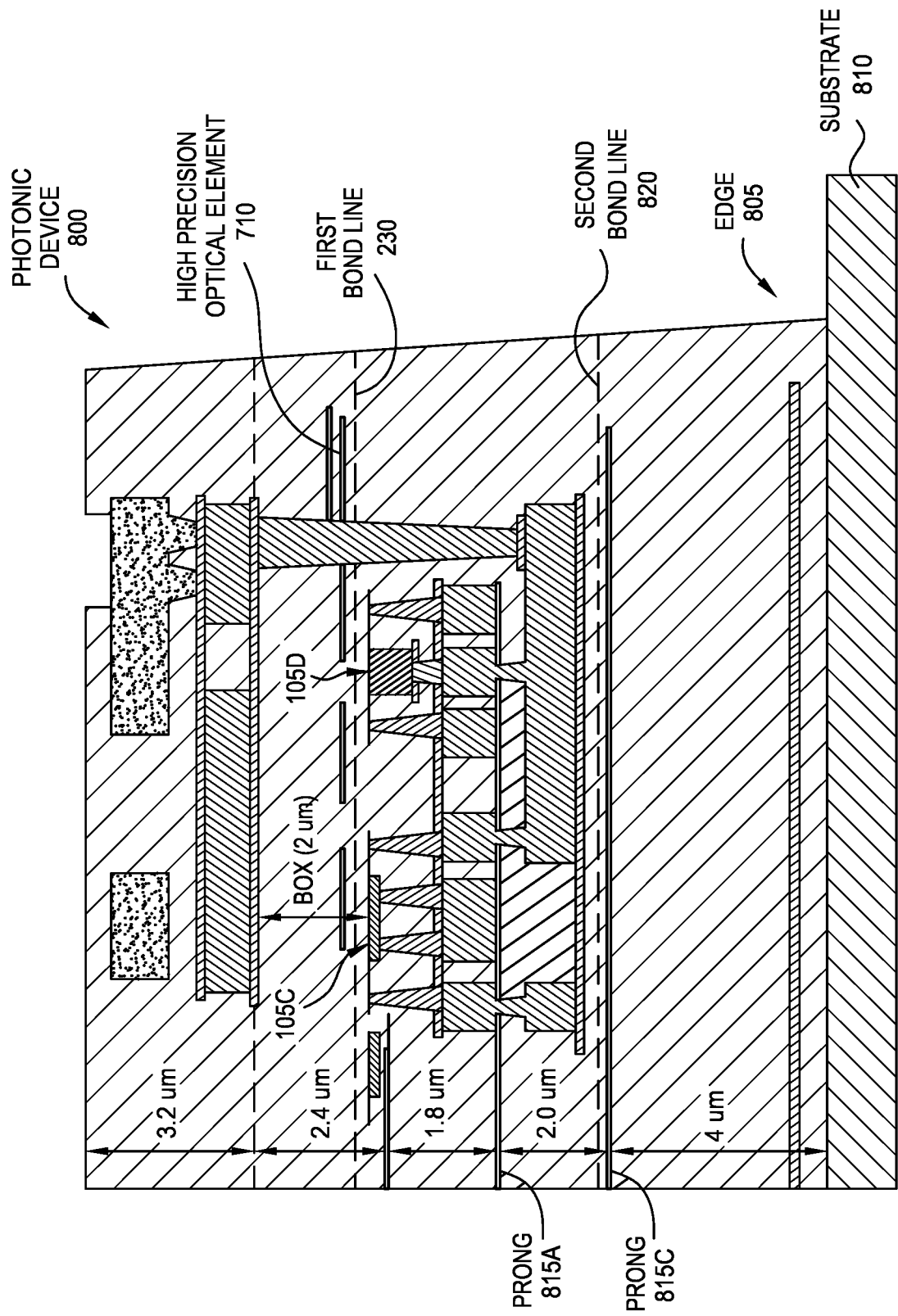
FIG. 8 illustrates a photonic device, according to one embodiment.

FIG. 8 illustrates a photonic device 800, according to one embodiment. In one embodiment, the photonic device 800 may be fabricated using a similar process as method 600. Further, the photonic device 800 has been processed to generate an edge 805 (e.g., a coupling interface) at which prongs 815A and 815C (collectively prongs 815) and the high precision optical element 110 can receive or transmit an optical signal with an external optical device (not shown). The edge 805 can be perpendicular to a substrate 810, or at a slight angle (+/−10 degrees) away from being perpendicular to the substrate 810 but can still be considered as being substantially perpendicular to the substrate 810.

The embodiments above can be modified so that one of the prongs 815 can also be a high precision optical element. For example, the prong 815C may have been fabricated in the third wafer 750 illustrated in FIG. 7D. That is, instead of forming all the prongs 745 in the combined wafer 735 in FIG. 7C, the bottommost prong 815C may be formed in the third wafer 750 and become optically coupled to the other prongs (and the high precision optical element 110) when the third wafer 750 is bonded to the combined wafer 735 as shown in FIG. 7D. Thus, in this example, the second wafer bond line 820 is between prong 815C and the prong 815A as well as the metal routing layers.

Further, the third wafer 750 may include other features in addition to the high precision prong 815C such as TSVs and decoupling capacitors.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

In view of the foregoing, the scope of the present disclosure is determined by the claims that follow.

We claim:

1. A method, comprising:
   providing an optical device in a first semiconductor wafer;
   providing an optical element in a second semiconductor wafer;
   wafer bonding the first semiconductor wafer and the second semiconductor wafer to form a combined wafer, wherein bonding the first semiconductor wafer and the second semiconductor wafer optically couples the optical device to the optical element, and wherein the optical device is optically coupled to the optical element to form an optical adapter for transmitting an optical signal between the optical device and an external light source;
   removing a substrate corresponding to the second semiconductor wafer from the combined wafer; and
   performing a second wafer bonding process either (i) before forming the combined wafer or (ii) after removing the substrate corresponding to the second semiconductor wafer.

2. The method of claim 1, wherein the second wafer bonding process occurs before forming the combined wafer and further comprises:
   wafer bonding a third semiconductor wafer containing the optical device with a carrier semiconductor wafer to form the first semiconductor wafer; and
   removing a substrate corresponding to the third semiconductor wafer to form an interface to bond the first semiconductor wafer to the second semiconductor wafer.

3. The method of claim 2, wherein the interface is formed from an oxide, and wherein oxide-oxide wafer bonding is used to bond the first semiconductor wafer to the second semiconductor wafer.

4. The method of claim 2, further comprising:
   forming back-side metal layer on the combined wafer that is electrically connected to the optical device, wherein the optical element is between the back-side metal layer and the optical device.

5. The method of claim 4, further comprising:
   forming a bond pad coupled to the back-side metal layer.

6. The method of claim 1, wherein the second wafer bonding process occurs after removing the substrate corresponding to the combined wafer, the method further comprising:
   forming a plurality of metal routing layers that are electrically connected to the optical device, wherein the optical element is between the plurality of metal routing layers and the optical device.

7. The method of claim 6, further comprising:
   forming a plurality of waveguides on the second semiconductor wafer, wherein the plurality of waveguides is optically coupled to the optical element.

8. The method of claim 7, wherein the plurality of waveguides form at least part of an optical adapter for transmitting an optical signal between the combined wafer and an external light source.

9. The method of claim 1, wherein the optical element is at least one of a silicon nitride or silicon oxynitride waveguide, a passive optical multiplexer, or a passive optical demultiplexer.

10. The method of claim 1, wherein the second semiconductor wafer bonding process includes a carrier semiconductor wafer comprising at least one of a through silicon via or CMOS electrical circuitry.

11. A method, comprising:
    providing an optical device in a first semiconductor wafer;
    providing an optical element in a second semiconductor wafer;
    performing a first wafer bonding process to bond the first semiconductor wafer and the second semiconductor wafer to form a combined wafer, wherein bonding the first semiconductor wafer and the second semiconductor wafer optically couples the optical device to the optical element;

after the first wafer bonding process, removing a substrate corresponding to the second semiconductor wafer from the combined wafer; and after removing the substrate corresponding to the second semiconductor wafer, performing a second wafer bonding process to bond the combined wafer to a third semiconductor wafer.

12. The method of claim 11, wherein after removing the substrate corresponding to the combined wafer, the method further comprising:

forming a plurality of metal routing layers that are electrically connected to the optical device, wherein the optical element is between the plurality of metal routing layers and the optical device.

13. The method of claim 12, further comprising:

forming a plurality of waveguides on the second semiconductor wafer, wherein the plurality of waveguides is optically coupled to the optical element.

14. The method of claim 13, wherein the plurality of waveguides form at least part of an optical adapter for transmitting an optical signal between the combined wafer and an external light source.

15. The method of claim 11, wherein the optical element is at least one of a silicon nitride or silicon oxynitride waveguide, a passive optical multiplexer, or a passive optical demultiplexer.

16. The method of claim 11, wherein the third semiconductor wafer is a carrier semiconductor wafer to support the combined wafer and is different from the first and second semiconductor wafer.

17. The method of claim 11, wherein the third semiconductor wafer comprising at least one of a through silicon via or CMOS electrical circuitry.

18. The method of claim 11, further comprising:

adding a plurality of backend features electrically connected to the optical device, wherein the optical device is disposed between the backend features and the optical element.

19. The method of claim 18, wherein the backend features comprise a through oxide via (TOV) and a bond pad, wherein a first end of the TOV electrically connects to the optical device while a second end of the TOV electrically connects to the bond pad.

* * * * *